United States Patent
Romero et al.

(10) Patent No.: US 11,649,763 B1
(45) Date of Patent: May 16, 2023

(54) RATING CONTROL ARCHITECTURE AND METHOD FOR HYBRID ELECTRIC ENGINE

(71) Applicant: Raytheon Technologies Corporation, Farmington, CT (US)

(72) Inventors: Michael M. Romero, Manchester, CT (US); Neil J. Terwilliger, Cheshire, CT (US); Daniel B. Kupratis, Wallingford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/847,804

(22) Filed: Jun. 23, 2022

(51) Int. Cl.
| | |
|---|---|
| *F02C 6/20* | (2006.01) |
| *B64D 27/24* | (2006.01) |
| *B64D 31/00* | (2006.01) |
| *B64D 27/10* | (2006.01) |
| *H02K 7/18* | (2006.01) |

(52) U.S. Cl.
CPC ............ *F02C 6/20* (2013.01); *B64D 27/10* (2013.01); *B64D 27/24* (2013.01); *B64D 31/00* (2013.01); *F05D 2220/70* (2013.01); *H02K 7/1815* (2013.01)

(58) Field of Classification Search
None
See application file for complete search history.

(56) References Cited

U.S. PATENT DOCUMENTS

| | | | | |
|---|---|---|---|---|
| 4,541,237 | A * | 9/1985 | Dickey | F02C 9/28 60/39.281 |
| 11,261,751 | B2 | 3/2022 | Golfin et al. | |
| 2013/0236296 | A1* | 9/2013 | Collopy | F02C 9/20 415/162 |
| 2017/0301157 | A1* | 10/2017 | Descubes | F02C 9/28 |
| 2018/0194483 | A1* | 7/2018 | Schwöller | B64D 31/04 |
| 2018/0229851 | A1* | 8/2018 | Joshi | F02C 9/16 |
| 2018/0354631 | A1* | 12/2018 | Adibhatla | F02C 3/113 |
| 2020/0056497 | A1* | 2/2020 | Terwilliger | B64D 41/00 |
| 2021/0354840 | A1 | 11/2021 | Mark et al. | |
| 2022/0009615 | A1 | 1/2022 | Mark et al. | |

* cited by examiner

*Primary Examiner* — Jason H Duger
(74) *Attorney, Agent, or Firm* — Cantor Colburn LLP

(57) ABSTRACT

Techniques for determining a fan spool speed value associated with a hybrid electric gas engine ("engine") are described herein. For example, a method includes generating a first fan spool speed value based on a base extraction amount. The method further includes generating a change in the first fan spool speed value based on a flight condition and a change in extraction amount. The method further includes generating a second fan spool speed value based on the extraction amount and an augmentation value for intersection of a combustion instability and burner pressure limit. The method further includes generating a second change in the second fan spool speed value based on the flight condition and the change in extraction amount. The method further includes determining a final fan spool speed value and operating the engine at the final fan spool speed value.

17 Claims, 8 Drawing Sheets

RATING CONTROL ARCHITECTURE AND METHOD FOR HYBRID ELECTRIC ENGINE

FIELD OF THE INVENTION

The subject matter described herein generally relates to a rating control architecture and method for a hybrid electric engine.

BACKGROUND

Conventional aircraft turbine engines use ratings to target a low spool speed that adheres to limits (e.g., a spool speed limit) and requirements (e.g., requirements of an airframer). Several different ratings can exist for high/low power operation. Interpolation between high and low power ratings is based on a throttle request. A base rating can be used to provide a corrected speed target assuming base levels of extraction/augmentation (e.g., amount of horsepower extraction). A reset can be used as a modifier to the base rating to compensate for varying levels of extraction/augmentation with the goal of adhering to limits/thrust/fuel flow reduction. For example, for certain flight conditions, more bleed flow may be needed. Accordingly, the reset may change a shaft speed to avoid a temperature limit.

BRIEF DESCRIPTION

In one exemplary embodiment, a method is provided. The method includes generating, by a base rating engine, a first fan spool speed value based on a base extraction amount. The first fan spool speed value is a value for operating a fan spool of a hybrid electric gas turbine engine. The method may further optionally include generating, by an extraction reset engine, a first change in the first fan spool speed value based on a flight condition and a change in extraction amount. The method further includes generating, by an augmentation reset engine, an orthogonal change in the first fan spool speed value based on the flight condition and the change in extraction amount. The method further includes generating, by a base sub-idle tables and logic engine, a second fan spool speed value based on the base extraction amount, and an augmentation value for intersection of a combustion instability and burner pressure limit. The method further includes generating, by a sub-idle tables and logic engine, a second change in the second fan spool speed value based on the flight condition and the change in extraction amount. The method further includes determining, based at least in part on a binary idle mode switch indicator, a final fan spool speed value. The method further includes operating the hybrid electric gas turbine engine based on the final fan spool speed value.

In addition to one or more of the features described herein, or as an alternative, further embodiments of the method may include that, responsive to the idle mode switch indicator indicating an idle state, the final fan spool speed value is based on the first fan spool speed value, the first change in the first fan spool speed value, and a throttle request.

In addition to one or more of the features described herein, or as an alternative, further embodiments of the method may include that, responsive to the idle mode switch indicator indicating a sub-idle state, the final fan spool speed value is based on the second fan spool speed value and the second change in the second fan spool speed value.

In addition to one or more of the features described herein, or as an alternative, further embodiments of the method may include: generating, by the base sub-idle tables and logic engine, an augmentation for intersection of the combustion instability and burner pressure limit; and generating, by the sub-idle tables and logic engine, a change in horsepower due to the change in extraction amount.

In addition to one or more of the features described herein, or as an alternative, further embodiments of the method may include generating a horsepower request based on a combination of the augmentation for intersection of the combustion instability and burner pressure limit and the change in horsepower due to the change in extraction amount.

In addition to one or more of the features described herein, or as an alternative, further embodiments of the method may include that the base rating engine, the extraction reset engine, the augmentation reset engine, the base sub-idle tables and logic engine, and the sub-idle tables and logic engine are implemented by a full authority digital engine control.

In addition to one or more of the features described herein, or as an alternative, further embodiments of the method may include that the fan spool is a high speed spool.

In addition to one or more of the features described herein, or as an alternative, further embodiments of the method may include that the fan spool is a low speed spool.

In addition to one or more of the features described herein, or as an alternative, further embodiments of the method may include that generating the second change in the second fan spool speed value is based on a table.

In addition to one or more of the features described herein, or as an alternative, further embodiments of the method may include that generating the second change in the second fan spool speed value is based on an on-board model.

In addition to one or more of the features described herein, or as an alternative, further embodiments of the method may include that the combustion instability limit is calculated based on a table, and the burner pressure limit is predicted via an on-board model.

In one exemplary embodiment, a controller is provided. The controller generates, by a base rating engine, a first compressor spool speed value based on a base extraction amount, the first compressor spool speed value being a value for operating a compressor spool of a hybrid electric gas turbine engine. The controller may further optionally generate, by an extraction reset engine, a first change in the first compressor spool speed value based on a flight condition and a change in extraction amount. The controller further generates, by an augmentation reset engine, an orthogonal change in the first compressor spool speed value based on the flight condition and the change in extraction amount. The controller further generates, by a base sub-idle tables and logic engine, a second compressor spool speed value based on the base extraction amount, and an augmentation value for intersection of a combustion instability and burner pressure limit. The controller further generates, by a sub-idle tables and logic engine, a second change in the second compressor spool speed value based on the flight condition and the change in extraction amount. The controller further determines, based at least in part on a binary idle mode switch indicator, a final compressor spool speed value. The controller further operates the hybrid electric gas turbine engine based on the final compressor spool speed value.

In addition to one or more of the features described herein, or as an alternative, further embodiments of the controller may include that, responsive to the idle mode switch indicator indicating an idle state, the final compressor spool speed value is based on the first compressor spool speed value, the first change in the first compressor spool speed value, and a throttle request.

In addition to one or more of the features described herein, or as an alternative, further embodiments of the controller may include that, responsive to the idle mode switch indicator indicating a sub-idle state, the final compressor spool speed value is based on the second compressor spool speed value and the second change in the second compressor spool speed value.

In addition to one or more of the features described herein, or as an alternative, further embodiments of the controller may include that generating the second change in the second fan spool speed value is based on a table.

In addition to one or more of the features described herein, or as an alternative, further embodiments of the controller may include that generating the second change in the second fan spool speed value is based on an on-board model.

In addition to one or more of the features described herein, or as an alternative, further embodiments of the controller may include that the combustion instability limit is calculated based on a table, and the burner pressure limit is predicted via an on-board model.

In one exemplary embodiment, an aircraft is provided. The aircraft includes a hybrid electric gas turbine engine comprising a compressor spool and a controller. The controller generates, by a base rating engine, a first compressor spool speed value based on a base extraction amount, the first compressor spool speed value being a value for operating the compressor spool of the hybrid electric gas turbine engine. The controller may further optionally generate, by an extraction reset engine, a first change in the first compressor spool speed value based on a flight condition and a change in extraction amount. The controller further generates, by an augmentation reset engine, an orthogonal change in the first compressor spool speed value based on the flight condition and the change in extraction amount. The controller further generates, by a base sub-idle tables and logic engine, an engine pressure ratio value based on the base extraction amount, and an augmentation value for intersection of a combustion instability and burner pressure limit. The controller further generates, by a sub-idle tables and logic engine, a second change in the engine pressure ratio value based on the flight condition and the change in extraction amount. The controller further determines, based at least in part on a binary idle mode switch indicator, a final engine pressure ratio value. The controller further operates the hybrid electric gas turbine engine based on the final engine pressure ratio value.

In addition to one or more of the features described herein, or as an alternative, further embodiments of the vehicle may include that generating the second change in the second fan spool speed value is based on a value selected from a group consisting of a table and an on-board model.

In addition to one or more of the features described herein, or as an alternative, further embodiments of the vehicle may include that the combustion instability limit is calculated based on a table, and the burner pressure limit is predicted via an on-board model.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

One or more embodiments described herein generally relates to a rating control architecture for a hybrid electric engine. Conventional ratings control architectures do not support hybrid electric engines. Accordingly, one or more embodiments described herein provide a ratings control architecture and method for hybrid electric engines. The ratings control architecture described herein provides for resets that compensate for varying levels of power augmentation for each of a high speed spool and a low speed spool of a hybrid electric engine.

Figure 1:
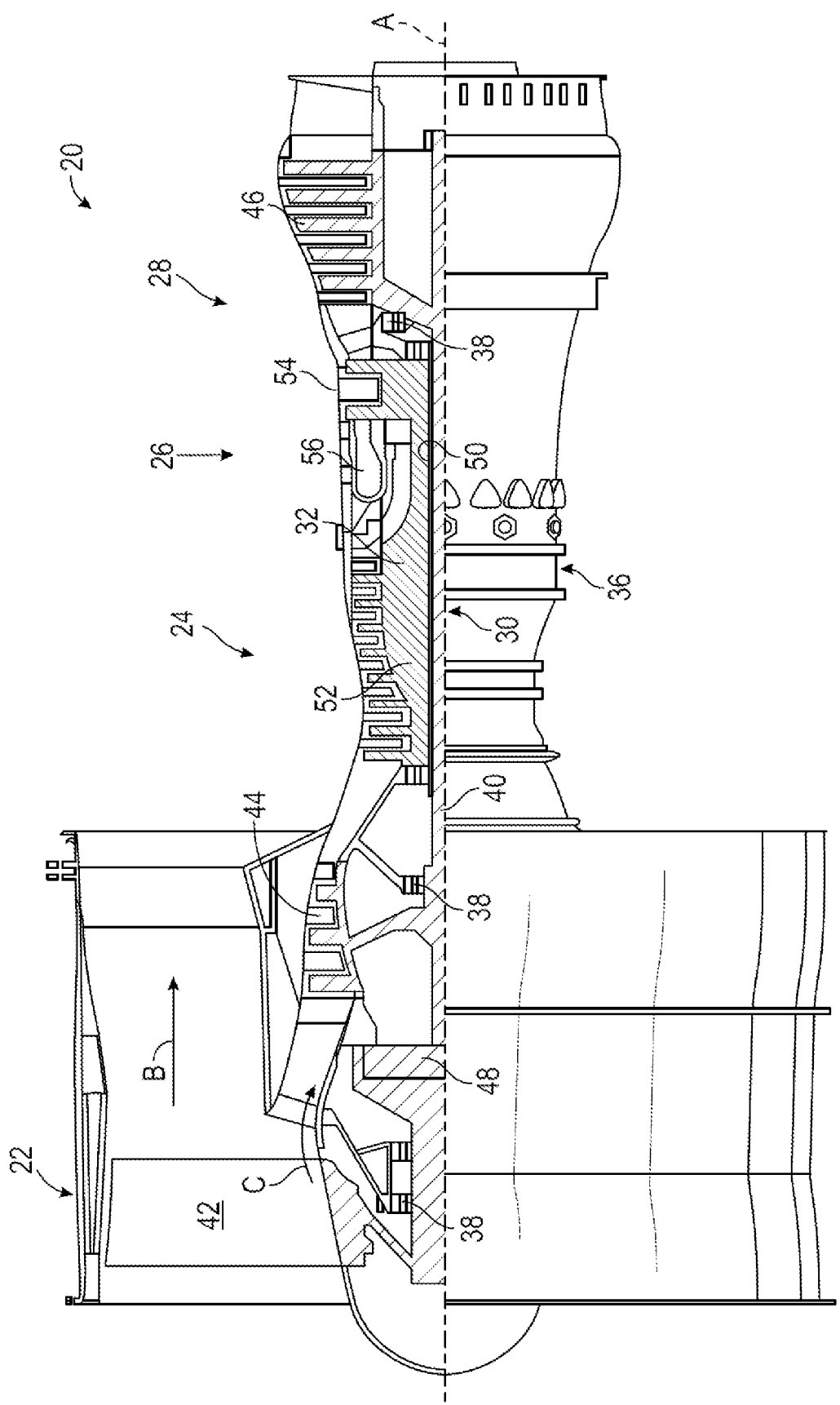
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. In embodiments, there exists an exit temperature from the engine turbine section, referred to as an "exit temperature." An engine temperature ratio (ETR) can be measured. An engine pressure ratio (EPR) is correlated to the ETR. Exit pressure from the low pressure turbine 46 is also measurable. Thus, by measuring ETR, the EPR can also be determined. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
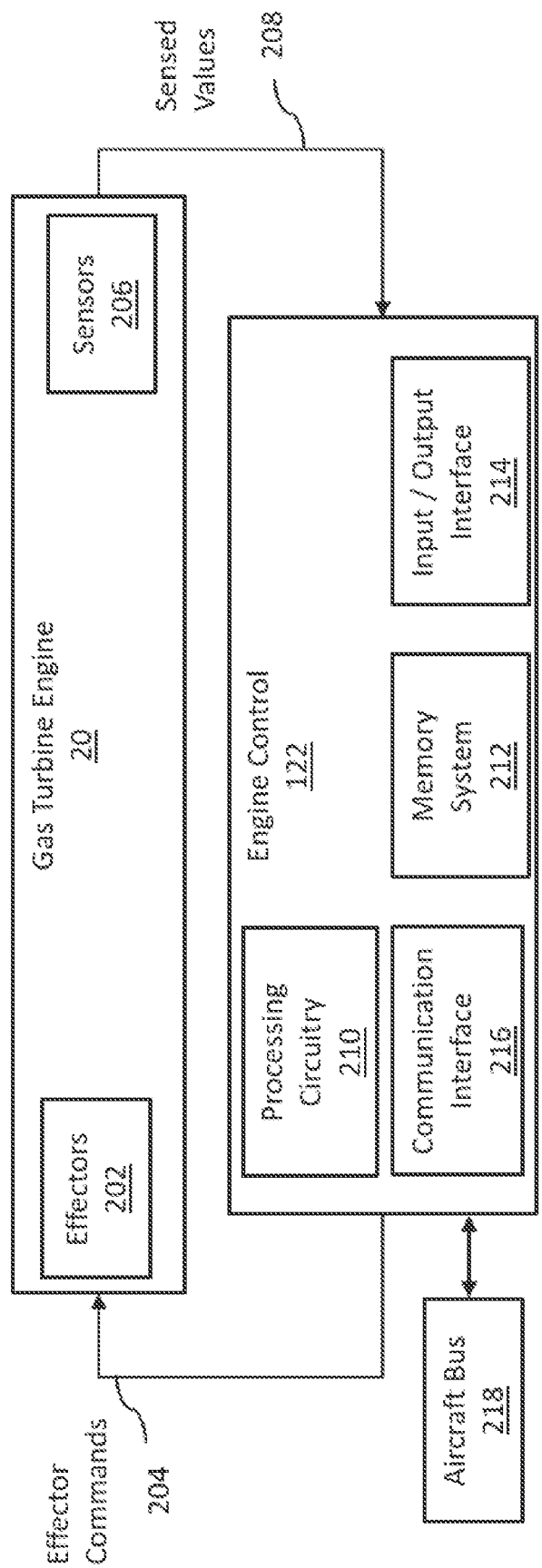
FIG. 2 depicts an example of an engine control configured to monitor and control operation of a gas turbine engine in real-time (or near-real time) according to one or more embodiments described herein.

FIG. 2 depicts an example of an engine control 122 configured to monitor and control operation of a gas turbine engine (e.g., the gas turbine engine 20) in real-time (or near-real time) according to one or more embodiments described herein. The engine control 122 can control effectors 202 of the gas turbine engine 20 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 20 and provide sensed values 208 as feedback to the engine control 122 to enable closed-loop control of the gas turbine engine 20 according to one or more control laws. Examples of the sensors 206 can include one or more temperature sensors, pressure sensors, strain gauges, speed sensors, accelerometers, lube sensors, and the like.

The engine control 122 (also referred to as a "controller") can be a full authority digital engine control (FADEC) that includes processing circuitry 210 (also referred to as a "processing device") and a memory system 212 configured to store a plurality of configuration items, where at least one of the configuration items includes a sequence of the computer executable instructions for execution by the processing circuitry 210. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 20. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements. The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources, such as discrete inputs/outputs and/or status signals. The communication interface 216 may communicate with an aircraft bus 218 of an aircraft. The aircraft bus 218 can provide aircraft-level parameters and commands that are used by the engine control 122 to control the gas turbine engine 20 in real-time. The communication interface 216 may also support communication with other components, such as other instances of the engine control 122, storage units, diagnostic units, communication adapters, off-board systems, and the like.

As described herein, conventional aircraft turbine engines use ratings to target a low spool speed that adheres to limits (e.g., a spool speed limit) and requirements (e.g., requirements of an airframer). Conventional ratings architectures include table reads that define operating speeds across different operating conditions. There are also modifiers to these speeds called resets in response to varying types of extractions including bleeds and power extraction. Resets are used to account for the sensitivities of thrust/operating limits when extractions are being used. Conventional ratings architectures do not account for high speed spool (e.g., high speed spool 32) and/or low speed spool (e.g., low speed spool 30) augmentation (provided electrically or pneumatically) in the resets. Conventional reset architectures also do not account for operation of a primary or secondary hybrid gas turbine in a net fuel reduction mode.

One or more embodiments described herein provides for a rating control architecture and method for the fuel savings mode and expands the rating control architecture to enable hybrid gas turbine engine thrust/limits control for the operating range of a hybrid gas turbine. One or more embodiments described herein creates a control methodology that defines how an engine responds to high/low spool augmentation to preserve thrust, respect operating limits, and operate in a net fuel reduction mode.

Figure 3:
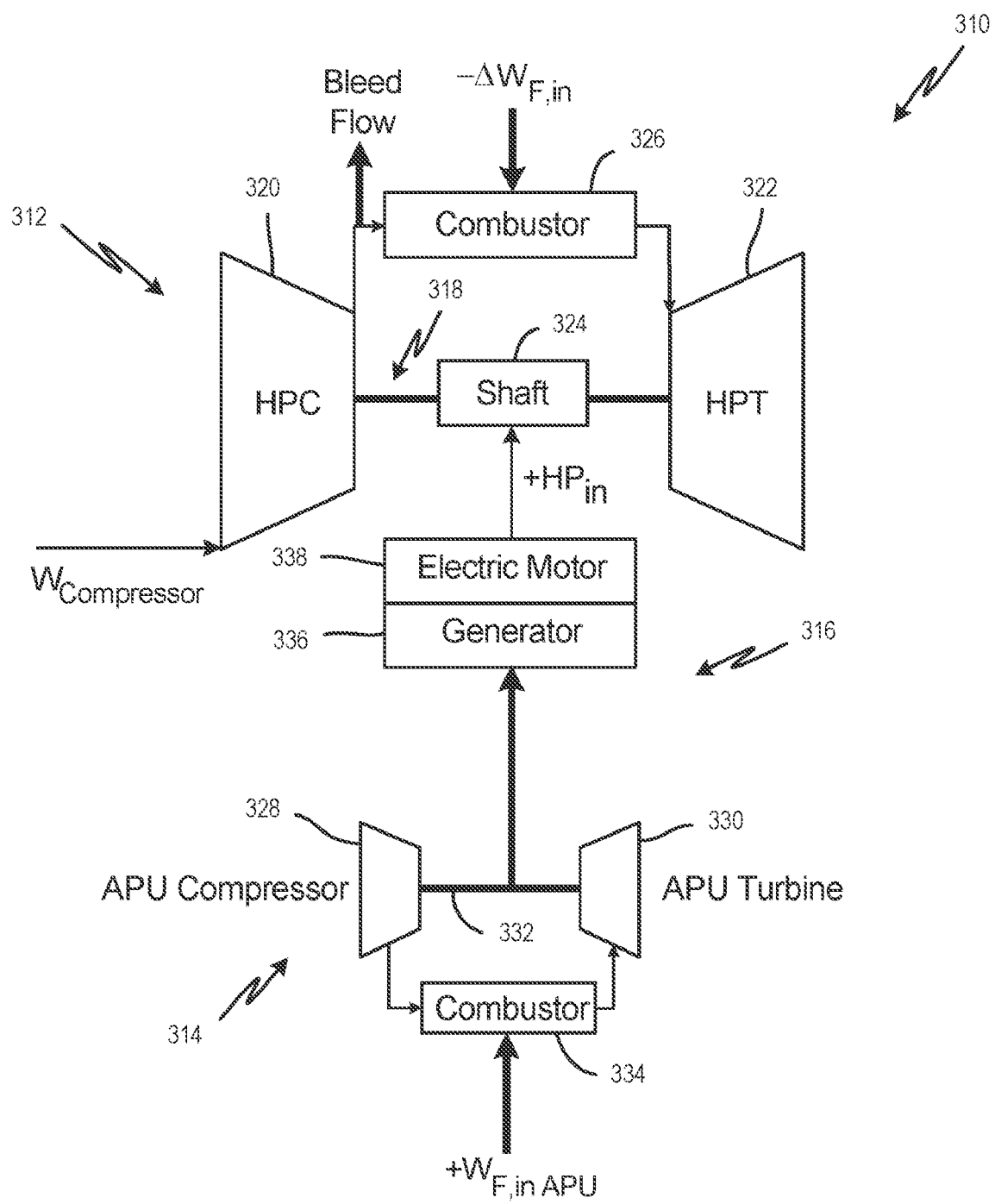
FIG. 3 is a schematic diagram of one embodiment of a gas turbine engine power assist system in which a secondary gas turbine engine boosts power to a primary gas turbine engine of an aircraft through a power linkage including a generator and motor.

FIG. 3 is a schematic diagram of one embodiment of a gas turbine engine power assist system 310, which includes primary engine 312 and secondary engine 314. Primary and secondary engines 312 and 314 are gas turbine engines. In some embodiments, primary engine 312 can be an aircraft propulsion engine, and secondary engine 314 can be an aircraft APU. Primary engine 312 and secondary engine 314 are interconnected by power linkage 316 through which power can be transferred between primary engine 312 and secondary engine 314.

Primary engine 312 can be a multi-spool engine, having at least a low speed spool and high speed spool (see, e.g., FIG. 1). For simplicity, only high speed spool 318 (e.g., high speed spool 32 of FIG. 1) is illustrated. High speed spool 318 includes high pressure compressor (HPC) 320 (e.g., high pressure compressor 52 of FIG. 1) and high pressure turbine (HPT) 322 (e.g., high pressure turbine 54 of FIG. 1) mounted on shaft 324. Although not illustrated, it will be understood by one of ordinary skill in the art that the low speed spool can carry a fan, low pressure compressor, and low pressure turbine. Primary engine 312 is a Brayton cycle engine wherein a mixture of fuel and compressed air from HPC 320 is ignited in combustor 326 to drive rotation of HPT 322 and thereby HPC 320 via shaft 324.

Like primary engine 312, secondary engine 314 can be a gas turbine engine. As illustrated, secondary engine 314 includes compressor 328 and turbine 330 mounted on shaft 332. A mixture of fuel and compressed air from compressor 328 is ignited in combustor 334 to drive turbine 330 and thereby compressor 328 via shaft 332. In some embodiments, secondary engine 314 can additionally include a power turbine (not shown) mounted on a power shaft, which is rotationally independent from shaft 332. Secondary engine 314 can provide power for a range of peripheral aircraft functions independent from propulsion or from the operation of primary engine 312. For example, secondary engine 314 can be used for power generation, for cabin air circulation, and/or to drive mechanical actuation of aircraft components. Secondary engine 314 can have a number of configurations or cycles (e.g., Wankel cycle) and is not limited to the gas turbine engine depicted.

Primary engine 312 and secondary engine 314 are connected by power linkage 316, which includes generator 336 and motor 338. When primary engine 312 is operating in an idle mode, fuel flow to primary engine 312 can be reduced and power extracted from secondary engine 314 can be provided to primary engine 312 via power linkage 316 to boost high speed spool 318. As used herein, an idle mode of operation refers to a rotational speed of the high speed spool 318 that is greater than the minimum rotational speed required to achieve starting of the engine and is less than the rotational speed (N2) associated with the maximum idle thrust of primary engine 312 set by the airframer. Idle is based on the engine's minimum limiting factor (e.g., minimum N1, N2, fuel air ratio, ECS bleed, etc.). Power assist system 310 can be used to supplement power to primary engine 312 during descent of the aircraft as well as during ground idle and other flight idle operations. As illustrated, rotational energy of shaft 332 of secondary engine 314 is transferred to shaft 324 on high speed spool 318 of primary engine 312 via generator 336 and motor 338. In some embodiments, generator 336 and motor 338 can be a combined motor-generator capable of operating in a reverse direction (i.e., transferring power from primary engine 312 to secondary engine 314). In other embodiments, generator 336 and motor 338 can be separate components coupled via an electrical connection (not shown). Generator 336 is a rotary generator driven by shaft 332 to produce electrical power, which is provided to motor 338. Motor 338, in turn, uses the electrical power to drive shaft 324 of high speed spool 318. In alternative embodiments, the power shaft (not shown) of secondary engine 314 can be used to boost high speed spool 318 of primary engine 312 via generator 336 and motor 338.

As illustrated, during operation of power assist system 310, fuel flow into combustor 326 of primary engine 312 is reduced, as indicated by −ΔWF, in, which represents a change in fuel flow from a conventional idle mode (i.e., idle without power assist). Fuel flow input (+WF, in APU) to secondary engine 314 is required to operate secondary engine 314. Secondary engine 314 provides supplementary horsepower (+HPin) to primary engine 312 via generator 336/motor 338. Supplemental power provided to primary engine 312 can cause high speed spool 318 to rotate at a higher speed than a conventional idle speed. The increased speed of high speed spool 318 can improve operation safety (i.e., improve compressor 320 operating stability margin) of primary engine 312 and response time from idle, allowing for a faster spool up time (time required to accelerate and increase fuel flow rate) if additional thrust output by engine 312 becomes necessary. Although fuel flow in secondary engine 314 is increased, a net fuel reduction can be achieved, as described herein.

In some embodiments, the architecture of power linkage 316 can be used in reverse for boosting power to secondary engine 314. In some operations, it may be beneficial to have a hybrid electric configuration in which an APU (secondary engine 314) is available on an as-needed basis throughout an entire flight. As such, it may be desired to run APU 314 at idle during the entire flight or keep APU 314 spooled up, but off, to ensure APU 314 is ready when needed. To reduce the amount of fuel needed to run APU 314 at idle or to keep APU 314 spooled up, power can be transferred from primary engine 312 to APU 314 when primary engine 312 is operating at high power. In this configuration, power assist system 310 is operated in reverse with high speed spool 318 on primary engine 312 driving a combined motor-generator. Generator 336 provides electric power to motor 338, which in turn drives shaft 332 of APU 314. Such power transfer can reduce the idle fuel burn of APU 314, such that APU 314 can remain on during flight and ready to respond on demand while reducing fuel usage, or keep APU 314 spooled up to reduce reaction time at start-up of primary engine 312 and the secondary engine (i.e., APU 314). In alternative embodiments, boosting power to secondary engine 314 can be supplied by the low spool of primary engine 312 through separate power linkage (not shown).

Figure 4:
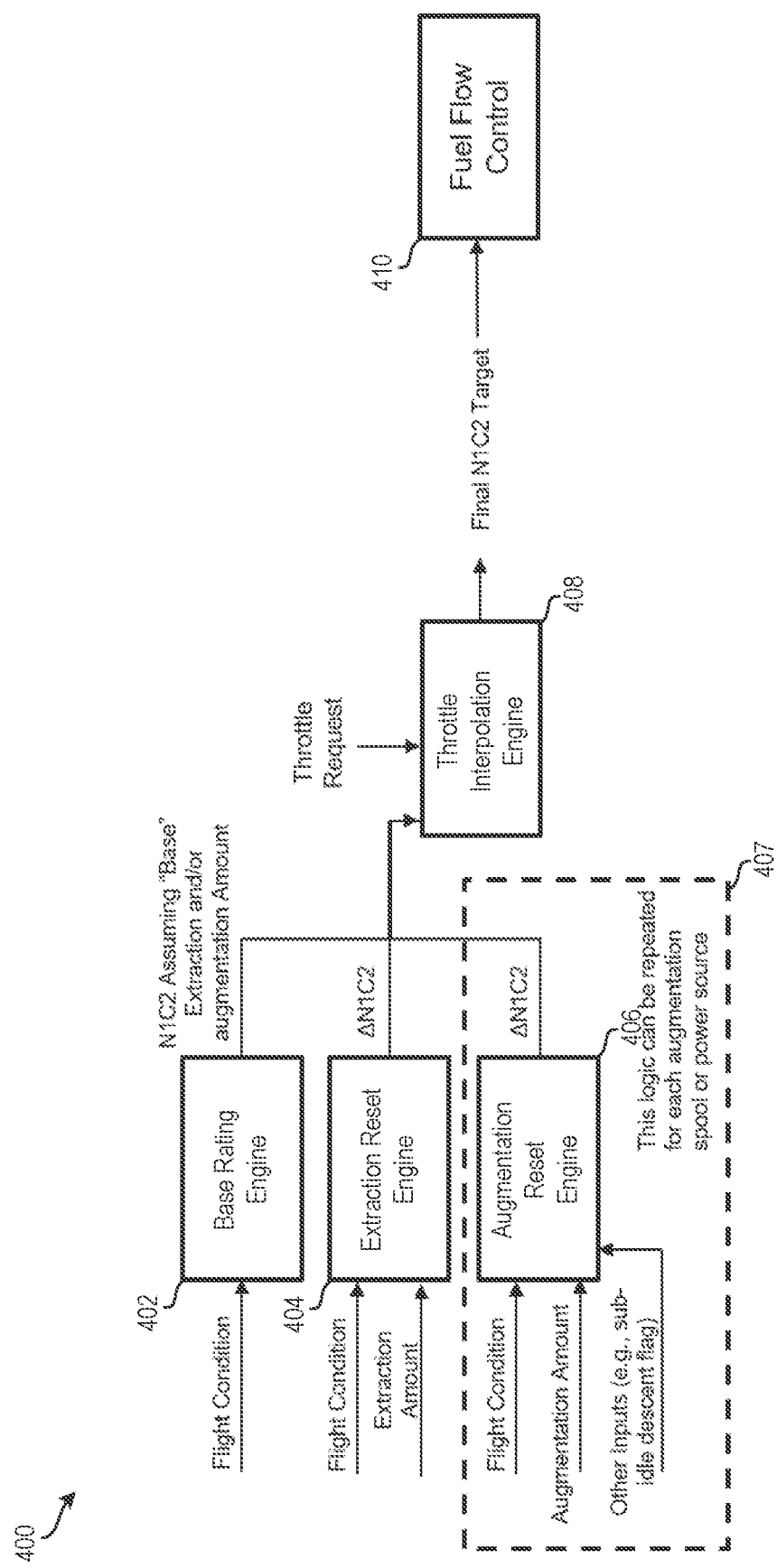
FIG. 4 depicts a ratings control architecture according to one or more embodiments described herein.

FIG. 4 depicts a ratings control architecture 400 according to one or more embodiments described herein. The ratings control architecture 400 can be implemented by the engine control 122 (e.g., a FADEC) and/or another suitable system, device, and/or controller. In this example, the architecture 400 includes a base rating engine 402, an extraction reset engine 404, and an augmentation reset engine 406.

The base rating engine 402 receives a flight condition, such as from the aircraft bus 218. The flight condition can indicate an operating condition of an aircraft, which may be, for example, taxing, taking off, climbing, cruising, descending, landing, and/or the like, including combinations and/or multiples thereof. The base rating engine 402 generates an N1C2 value (i.e., a fan spool speed value) that assumes a base extraction (e.g., bleed air extraction, power extraction, etc.) amount and/or augmentation amount based on the flight condition.

The extraction reset engine 404 receives the flight condition and also an extraction amount (a delta from the base extraction amount), which the extraction reset engine 404 uses to generate a change (Δ) N1C2 value, which represents a corrected speed target delta based on an off nominal level of extraction/augmentation. According to one or more embodiments described herein, the resets can be pre-determined based on experimental data and/or determined using a model, such as an on-board model stored in the engine control 122 (e.g., in the memory system 212). That is, the on-board model can calculate the resets in real-time (or near-real-time). The extraction reset engine 404 can include one or more other inputs according to one or more embodiments described herein, such as a determination of flying in different regimes beneficial for fuel flow reduction or thrust in order to hit specified requirements.

The augmentation reset engine 406 receives the flight condition, an augmentation amount, and other inputs (e.g., a sub-idle descent flag) and generates another change (Δ) N1C2 value. Logic 407 for the augmentation reset engine 406 can be repeated for each augmentation spool or power source.

The outputs of each of the base ratings engine 402, the extraction reset engine 404, and the augmentation reset engine 406 are input into a throttle interpolation engine 408 along with a throttle request. The throttle request represents a pilot or automated system input indicating an amount of desired throttle. The throttle interpolation engine generates a final N1C2 target based on the outputs of the base rating engine 402, the extraction reset engine 404, and the augmentation reset engine 406. The final N1C2 target generated by the throttle interpolation engine 408 is input into a fuel flow control 410 to control an amount of fuel flow into combustor 326 of primary engine 312, for example. The throttle interpolation logic 408 can interpolate between one or more high and low power ratings.

Figure 5:
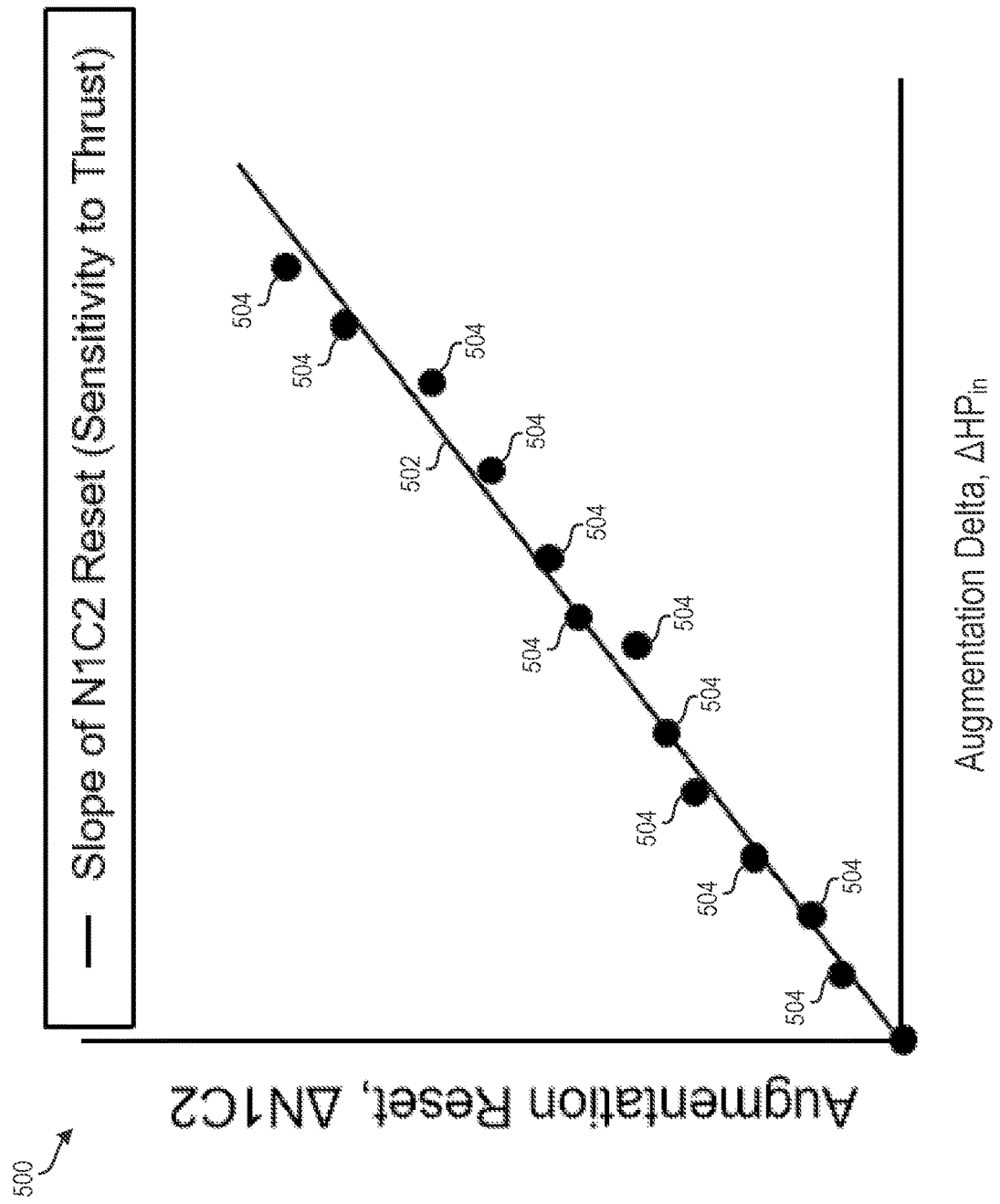
FIG. 5 depicts a graph mapping inputs to adhere to thrust requirements according to one or more embodiments described herein.

The architecture 400 can be used to map inputs to adhere to thrust requirements. For example, FIG. 5 depicts a graph 500 mapping inputs (e.g., the sensitivity used in augmentation reset engine 406) to adhere to thrust requirements. The graph 500 shows a change in augmentation (augmentation delta) as a change (Δ) in input horsepower (HPin) (ΔHPin) plotted against the augmentation reset (e.g., the output of the augmentation reset engine 406) as a change (Δ) in N1C2 (ΔN1C2). The line 502 represents the slope of the N1C2 reset (sensitivity to thrust) fit through the points 504. That is, the graph 500 plots the input (in horsepower) into a spool (e.g., one of the low speed spool 30, the high speed spool 32) and observes the change in thrust (ΔN1C2).

As an example, boosting the low speed spool 30 results in a drop in core flow at a constant speed. This results in net reduction in thrust. In this example, a model can be used to predetermine a reset for corrected speed when low spool power augmentation is applied. The goal is to maintain thrust for varying levels of low spool boost. This can be repeated for adherence to turbine temperatures, operability limits, and/or the like, including combinations and/or multiples thereof.

With continued reference to FIG. 4, a control flag input into the augmentation reset engine 406 can determine when flying in different regimes as described herein. In an example, an area of net fuel reduction is possible when the regime is a descent idle condition. A flag can be implemented to determine when this condition occurs (e.g., a switch in the cockpit or other logic that determines when a descent at idle occurs). When this flag is set (e.g., is "true"), an N1C2 target can be calculated or read from a pre-determined table in which bleed pressure and combustion instability are adhered to while reducing fuel consumption.

The architecture 400 can map augmentation reset to sub-idle descent mode according to one or more embodiments described herein. For sub-idle descent with an onboard model, calculation of combustor blowout is complicated. This is due to high core flow uncertainty at idle. The onboard model described herein derives what speed to run to give a burner pressure limit, and the engine control 122 corrects for any error as it closes in on that limit with burner pressure sensors. Given that information, one approach is to implement pre-determined resets to predict the blow out limit (e.g., one or more tables), and then the onboard model calculates the speed at which the engine will encounter a burner pressure limit. The intersection between these two limits provides an optimum net fuel flow reduction.

Figure 6:
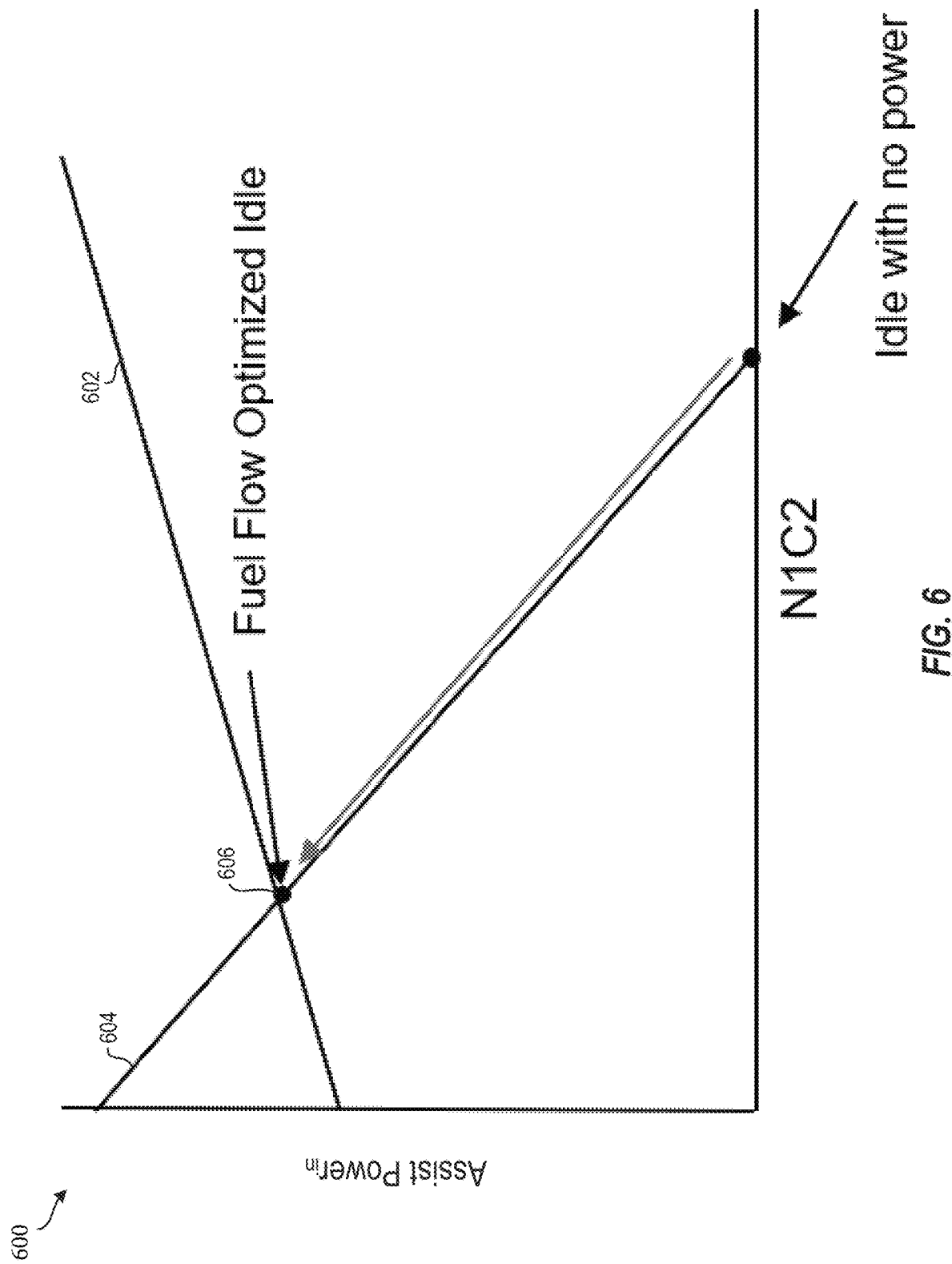
FIG. 6 depicts a graph showing the mapping of the augmentation reset to sub-idle descent mode according to one or more embodiments described herein.

Particularly, FIG. 6 depicts a graph 600 showing the mapping of the augmentation reset to sub-idle descent mode according to one or more embodiments described herein. The graph 600 maps the N1C2 value against assist power input (Assist Powerin) provided by the low speed spool or high speed spool, for example. Particularly, the graph 600 includes a line 602, which represents a lean blow out or combustor instability, and a line 604, which represents a minimum bleed pressure. The lean blow out line 602 represents predetermined values stored in a table, and the minimum bleed pressure line 604 is calculated using an on-board model or is predetermined in a table. The slope of the minimum bleed pressure line 604 in FIG. 6 (e.g. Assist $Power_{in}$ versus N1C2) is orthogonal to the slope of line 502 in FIG. 5 (e.g. Augmentation Reset, $\Delta$N1C2 versus Augmentation Delta, $\Delta HP_{in}$). The intersection 606 is the intersection of the lines 602, 604 and represents a fuel flow optimization at idle condition. That is, the intersection 606 represents idle where fuel flow is optimized. Intersection 606 of the limits (e.g., lines 602, 604) may change depending on off-nominal base extractions. The architecture 700, described below, can provide a reset to account for off nominal extractions. The reset provides a delta to the augmentation and N1C2 request to target the new intersection based on a sensitivity to limits as augmentation amount is varied. The line 608 represents how a slow transient might traverse from a conventional idle up to the intersection of the limits (e.g., the intersection 606). It should be understood that the constraining idle limits presented in lines 602 and 604 can include any limits that may restrict the operation of the gas turbine and are not limited to combustor instability and burner pressure. Non-limiting examples of such limits include: compressor stability (meaning surge margin) and compressor pressure ratio; turbine cooling flow back-flow margin and combustor liner pressure loss; exhaust nozzle pressure ratio and exhaust nozzle pressure loss; fan blade flutter and fan speed; and fan shaft critical speed margin and fan airflow.

Figure 7:
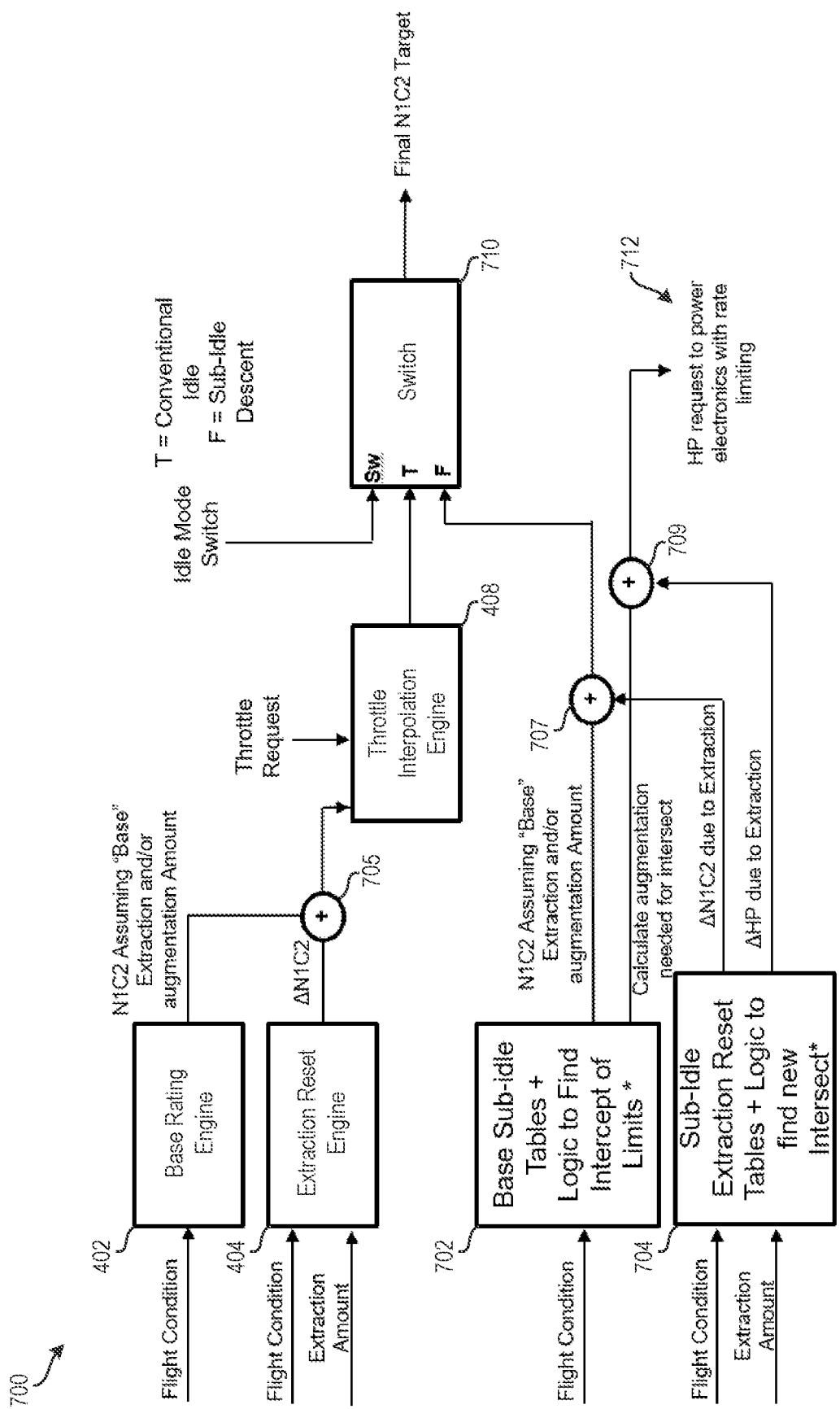
FIG. 7 depicts an architecture for mapping of the augmentation reset to sub-idle descent mode according to one or more embodiments described herein.

FIG. 7 depicts an architecture 700 for mapping of the augmentation reset to sub-idle descent mode according to one or more embodiments described herein. The ratings control architecture 700 can be implemented by the engine control 122 (e.g., a FADEC) and/or another suitable system, device, and/or controller. In this example, the architecture 700 includes the base rating engine 402 and the extraction reset engine 404 as described herein. The base rating engine 402 generates an N1C2 value that assumes a base extraction and/or augmentation amount. The extraction reset engine 404 generates a change ($\Delta$) N1C2 value. The outputs of the engines 402, 404 are summed at block 705 and input into throttle interpolation engine 408 along with a throttle request as described herein. The throttle interpolation logic 408 can interpolate between one or more high and low power ratings.

The ratings control architecture 700 also includes base sub-idle tables and logic engine 702, and sub-idle extraction reset tables and logic engine 704. The base sub-idle tables and logic engine 702 identifies the intersection between limits (see FIG. 6). Particularly, the base sub-idle tables and logic engine 702 receives the flight condition and uses tables and/or logic (e.g., a model) to find the interception of limits. The engine 702 generates an N1C2 value assuming base extraction and/or augmentation amount. The engine 702 also generates an augmentation request corresponding to the intersection between limits depicted in 606.

The sub-idle extraction reset tables and logic engine 704 finds new intercepts varying levels of extraction/augmentation. The engine 704 receives the flight condition and an extraction amount. Using these values, the engine 704 generates a change in the N1C2 and augmentation request value due to an off nominal extraction amount and a flight condition. In an example, the sub-idle extraction reset tables and logic engine 704 uses predetermined sensitivities to limits using a data-matched model. In another example, the sub-idle extraction reset tables and logic engine 704 uses a pre-determined sensitivity to combustor blowout limit and an on-board model figures out what N1C2 value to run to given a burner pressure limit. Any error can be reduced by referencing a pressure sensor as it gets closer to the limit.

The N1C2 value generated by the engine 702 is summed (at block 707) with the change in N1C2 value due to extraction generated by the engine 704, which is then fed into switch 710. Switch 710 determines an idle mode (e.g., represented by an idle mode switch indicator). A final N1C2 target is based on the output of the throttle interpolation engine 408, the N1C2 value generated by the engine 702 combined with the change in N1C2 value generated by the engine 704, and an idle mode switch. The value "T" represents a conventional idle state, and the value "F" represents a sub-idle descent state. The switch 710 operable depending on the idle mode switch indicator such that, in a conventional idle state "T" the final N1C2 target output by the switch 710 is from the throttle interpolation engine 408 but in a sub-idle descent state, the switch outputs the N1C2 value generated by the engine 702 combined with the change in N1C2 value represented by the value "F" generated by the engine 704.

The augmentation needed for intersect from the engine 702 and the change in horsepower due to extraction from the engine 704 can be summed (at block 709) as shown to generate a horsepower request 712, which is a request for augmentation sent to the powering electronics with rate limiting. Rate limiting can be included such that transiently, the gas turbine respects all operating limits as augmentation is added to or removed from a high speed spool 318 (e.g., high speed spool 32 of FIG. 1) and APU 314.

Figure 8:
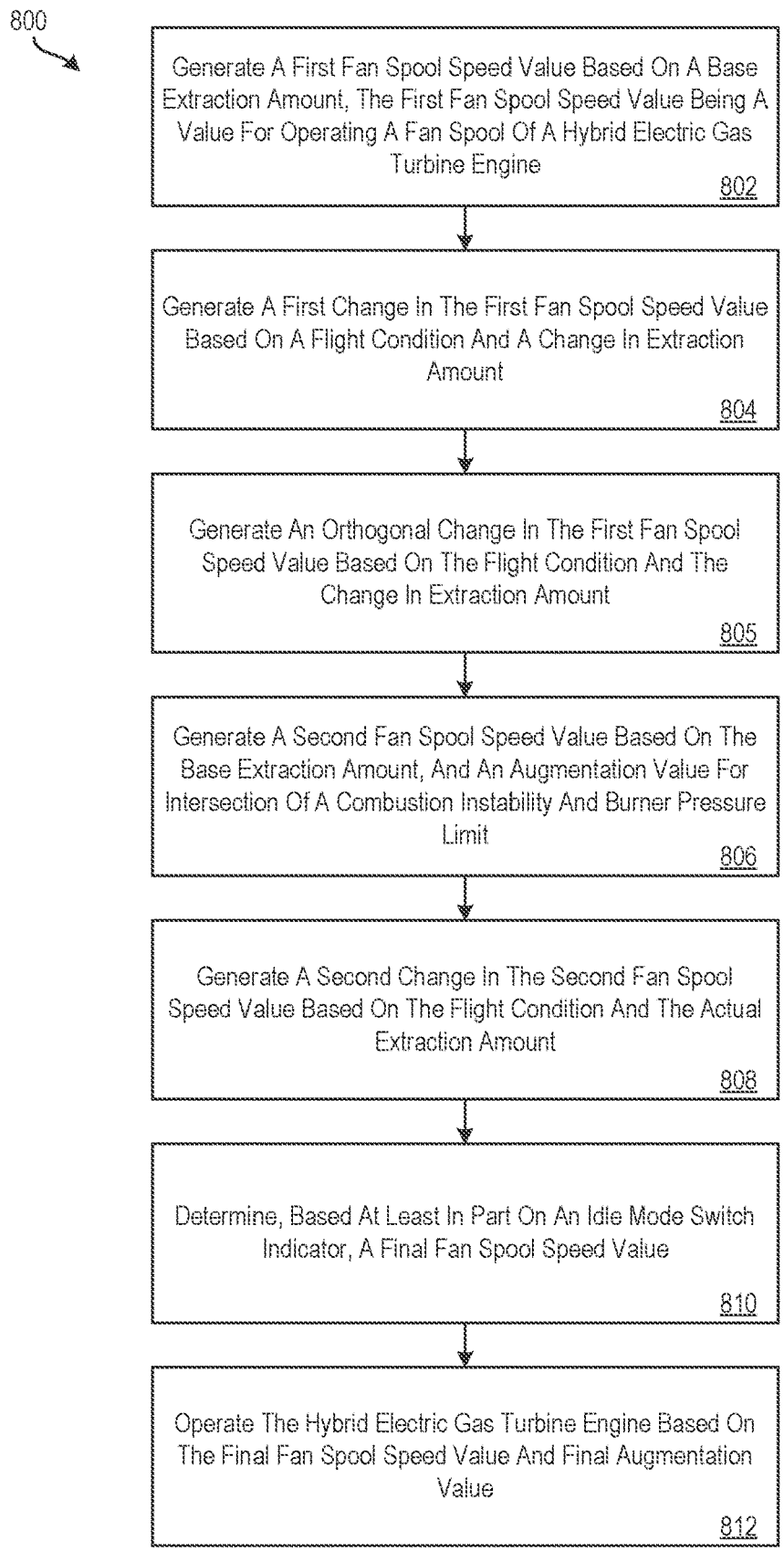
FIG. 8 is block diagram of a method for controlling a hybrid electric gas turbine engine according to one or more embodiments described herein.

FIG. 8 depicts a flow diagram of a method 800 for controlling a hybrid electric gas turbine engine according to one or more embodiments described herein. The method 800 can be implemented using the engine control 122 (e.g., a FADEC) and/or another suitable system, device, and/or controller. The method 800 is now described in more detail with reference to the architecture 700 of FIG. 7 but is not so limited.

At block 802, the base rating engine 402 generates a first fan spool speed value (N1C2) based on a base extraction amount. The first fan spool speed value being a value for operating a fan low speed spool 30 that includes an inner shaft 40 that interconnects a fan 42, of a hybrid electric gas turbine engine. At block 804, the extraction reset engine 404 may optionally generate a first change in the first fan spool speed value ($\Delta$N1C2) based on a flight condition and a change in extraction amount. At block 805, the augmentation reset engine 406 generates an orthogonal change in the first fan spool speed value based on the flight condition and the change in extraction amount. At block 806, the base sub-idle tables and logic engine 702 generates a second fan spool speed value (N1C2) based on the base extraction amount, and an augmentation value for intersection 606 (e.g., intersection of a combustion instability and burner pressure limit). At block 808, the sub-idle tables and logic engine 704 generates a second change ($\Delta$N1C2) in the second fan spool speed value based on the flight condition and the change in the extraction amount. At block 810, it can be determined, based at least in part on an idle mode switch indicator, a final fan low spool 30 speed value. At block 812, the hybrid electric gas turbine engine is operated based on the final fan spool speed value and final augmentation value (e.g., sent to the power electronics).

In examples, the combustion instability limit is calculated based on a table, and the burner pressure limit is predicted via an on-board model. The resulting intersection between the limits is targeted via fan spool speed and augmentation amount.

Although FIG. 8 is described with reference to a fan spool, the method 800 could also be applicable to compressor spools according to one or more embodiments described herein.

Additional processes also may be included, and it should be understood that the process depicted in FIG. 8 represents an illustration, and that other processes may be added or existing processes may be removed, modified, or rearranged without departing from the scope of the present disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
generating, by a base rating engine, a first fan spool speed value based on a base extraction amount, the first fan spool speed value being a value for operating a fan spool of a hybrid electric gas turbine engine;
generating, by an augmentation reset engine, an orthogonal change in the first fan spool speed value based on a flight condition and a change in extraction amount;
generating, by a base sub-idle tables and logic engine, a second fan spool speed value based on the base extraction amount, and an augmentation value for intersection of a combustion instability and burner pressure limit;
generating, by a sub-idle tables and logic engine, a second change in the second fan spool speed value based on the flight condition and the change in extraction amount;
determining, based at least in part on a binary idle mode switch indicator and at least one of the first fan spool speed value or the second fan spool speed value, a final fan spool speed value; and
operating the hybrid electric gas turbine engine based on the final fan spool speed value.

2. The method of claim 1, further comprising generating, by an extraction reset engine, a first change in the first fan spool speed value based on the flight condition and the change in extraction amount, wherein, responsive to the idle mode switch indicator indicating an idle state, the final fan spool speed value is based on the first fan spool speed value, the first change in the first fan spool speed value, and a throttle request.

3. The method of claim 1, wherein, responsive to the idle mode switch indicator indicating a sub-idle state, the final fan spool speed value is based on the second fan spool speed value and the second change in the second fan spool speed value.

4. The method of claim 1, further comprising:
generating, by the base sub-idle tables and logic engine, the augmentation value for intersection of the combustion instability and burner pressure limit; and
generating, by the sub-idle tables and logic engine, a change in horsepower due to the change in extraction amount.

5. The method of claim 4, further comprising generating a horsepower request based on a combination of the augmentation value for intersection of the combustion instability and burner pressure limit and the change in horsepower due to the change in extraction amount.

6. The method of claim 1, wherein the base rating engine, the augmentation reset engine, the base sub-idle tables and logic engine, and the sub-idle tables and logic engine are implemented by a full authority digital engine control.

7. The method of claim 1, wherein the fan spool is a high speed spool.

8. The method of claim 1, wherein the fan spool is a low speed spool.

9. The method of claim 1, wherein generating the second change in the second fan spool speed value is based on a table.

10. The method of claim 1, wherein generating the second change in the second fan spool speed value is based on an on-board model.

11. The method of claim 1, wherein the combustion instability is calculated based on a table, and the burner pressure limit is predicted via an on-board model.

12. A controller configured to:
generate, by a base rating engine, a first compressor spool speed value based on a base extraction amount, the first compressor spool speed value being a value for operating a compressor spool of a hybrid electric gas turbine engine;
generate, by an augmentation reset engine, an orthogonal change in the first compressor spool speed value based on a flight condition and a change in extraction amount;
generate, by a base sub-idle tables and logic engine, a second compressor spool speed value based on the base extraction amount, and an augmentation value for intersection of a combustion instability and burner pressure limit;

generate, by a sub-idle tables and logic engine, a second change in the second compressor spool speed value based on the flight condition and the change in extraction amount;

determine, based at least in part on a binary idle mode switch indicator and at least one of the first compressor spool speed value or the second compressor spool speed value, a final compressor spool speed value; and operate the hybrid electric gas turbine engine based on the final compressor spool speed value.

13. The controller of claim 12 further to generate, by an extraction reset engine, a first change in the first compressor spool speed value based on the flight condition and the change in extraction amount, wherein, responsive to the idle mode switch indicator indicating an idle state, the final compressor spool speed value is based on the first compressor spool speed value, the first change in the first compressor spool speed value, and a throttle request.

14. The controller of claim 12, wherein, responsive to the idle mode switch indicator indicating a sub-idle state, the final compressor spool speed value is based on the second compressor spool speed value and the second change in the second compressor spool speed value.

15. The controller of claim 12, wherein generating the second change in the second compressor spool speed value is based on a table.

16. The controller of claim 12, wherein generating the second change in the second compressor spool speed value is based on an on-board model.

17. The controller of claim 12, wherein the combustion instability is calculated based on a table, and the burner pressure limit is predicted via an on-board model.

* * * * *